(12) United States Patent
Torvinen et al.

(10) Patent No.: US 11,374,941 B2
(45) Date of Patent: Jun. 28, 2022

(54) WIRELESS COMMUNICATIONS

(71) Applicant: TELEFONAKTIEBOLAGET LM ERICSSON (PUBL), Stockholm (SE)

(72) Inventors: Vesa Torvinen, Sauvo (FI); Noamen Ben Henda, Stockholm (SE); Vesa Lehtovirta, Espoo (FI); Katharina Pfeffer, Graz (AT); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 217 days.

(21) Appl. No.: 15/772,760

(22) PCT Filed: Nov. 2, 2016

(86) PCT No.: PCT/EP2016/076408
§ 371 (c)(1),
(2) Date: May 1, 2018

(87) PCT Pub. No.: WO2017/076891
PCT Pub. Date: May 11, 2017

(65) Prior Publication Data
US 2018/0359642 A1 Dec. 13, 2018

Related U.S. Application Data

(60) Provisional application No. 62/249,538, filed on Nov. 2, 2015.

(51) Int. Cl.
*H04W 12/041* (2021.01)
*H04L 9/40* (2022.01)
(Continued)

(52) U.S. Cl.
CPC ......... *H04L 63/123* (2013.01); *H04W 12/041* (2021.01); *H04W 12/106* (2021.01); *H04L 67/12* (2013.01); *H04W 84/042* (2013.01)

(58) Field of Classification Search
CPC ... H04W 12/10; H04W 12/04; H04W 84/042; H04W 12/0401; H04W 12/1006;
(Continued)

(56) References Cited

U.S. PATENT DOCUMENTS 10,015,669 B2   7/2018 He
2008/0076392 A1 3/2008 Khetawat et al.
(Continued)

FOREIGN PATENT DOCUMENTS

CN   101001252 A   7/2007
CN   101406024 A   4/2009
(Continued)

OTHER PUBLICATIONS

Communication pursuant to Article 94(3) EPC for European patent apln. 16 790 353.3 dated Oct. 18, 2019, 6 pages.
(Continued)

*Primary Examiner* — Huan V Doan
(74) *Attorney, Agent, or Firm* — Rothwell, Figg, Ernst & Manbeck, P.C.

(57) ABSTRACT

Integrity protection is activated for user plane data transferred between a network node and a terminal device of the cellular communications network. The activation can be initiated by the terminal device sending a request message to a second network node. Thus, a UE, such as a Cellular IoT UE, and a network node such as a SGSN are able to use LLC layer integrity protection for both control plane and user plane data.

31 Claims, 10 Drawing Sheets

(51) Int. Cl.
  *H04W 12/106* (2021.01)
  *H04L 67/12* (2022.01)
  *H04W 84/04* (2009.01)
(58) Field of Classification Search
  CPC .............. H04W 12/041; H04W 12/106; H04L 63/123; H04L 67/12
  See application file for complete search history.

(56) References Cited

U.S. PATENT DOCUMENTS

| | | | | |
|---|---|---|---|---|
| 2009/0017863 | A1* | 1/2009 | Rowley | H04L 9/0844 455/550.1 |
| 2009/0111423 | A1* | 4/2009 | Somasundaram | H04W 12/02 455/410 |
| 2010/0054472 | A1* | 3/2010 | Barany | H04L 63/0428 380/270 |
| 2010/0166184 | A1* | 7/2010 | Wu | H04W 12/04 380/270 |
| 2011/0171953 | A1 | 7/2011 | Faccin et al. | |
| 2011/0255693 | A1* | 10/2011 | Escott | H04L 9/085 380/270 |
| 2011/0312299 | A1* | 12/2011 | Patil | H04L 63/20 455/410 |
| 2012/0039472 | A1* | 2/2012 | Liu | H04W 12/0431 380/270 |
| 2012/0182929 | A1* | 7/2012 | Chen | H04L 63/1458 370/315 |
| 2012/0246325 | A1* | 9/2012 | Pancorbo Marcos | H04L 63/102 709/227 |
| 2012/0315878 | A1* | 12/2012 | Deng | H04W 12/10 455/411 |
| 2013/0010688 | A1 | 1/2013 | Yi et al. | |
| 2016/0044002 | A1* | 2/2016 | Ying | H04L 9/14 713/168 |
| 2017/0359719 | A1* | 12/2017 | Li | H04L 9/0847 |
| 2018/0034635 | A1* | 2/2018 | Zhang | H04L 9/0827 |
| 2018/0167807 | A1* | 6/2018 | Ying | H04L 63/06 |
| 2018/0249479 | A1* | 8/2018 | Cho | H04L 63/0428 |

FOREIGN PATENT DOCUMENTS

| | | |
|---|---|---|
| CN | 102487507 A | 6/2012 |
| CN | 102625307 A | 8/2012 |
| CN | 103686704 A | 3/2014 |
| RU | 2435319 C2 | 11/2011 |
| WO | 2009/012281 A2 | 1/2009 |
| WO | 2015/153589 A1 | 10/2015 |

OTHER PUBLICATIONS

Ericsson: "Minimal Security Enhancements for GSM/GPRS to support secure delivery of MTC data," 3GPP Draft; 3P-140615—3rd Generation Partnership Project (3GPP), Mobile Competence Centre; 650, Route Des Lucioles, vol. TSG GERAN, No. Ljubljana, Slovenia; Aug. 25-Aug. 29, 2014 Aug. 24, 2014 (Aug. 24, 2014), XP050779905, 4 pages.

International Search Report and Written Opinion dated Jan. 24, 2017 issued in International Patent Application No. PCT/EP2016/076408. (10 pages).

3GPP, 3rd Generation Partnership Project; Technical Specification Group Services and System Aspects; Study on EGPRS Access Security Enhancements with relation to cellular IoT (Release 13), 3GPP TR 33.860 V0.3.0 (Aug. 2015). (22 pages).

3GPP, 3rd Generation Partnership Project; Technical Specification Group Services and System Aspects; Study on battery efficient security for very low throughput Machine Type Communication Devices (Release 13), 3GPP TR 33.863 V0.3.0 (Aug. 2015). (39 pages).

3GPP, 3rd Generation Partnership Project; Technical Specification Group GSM/EDGE; Radio Access Network; GERAN Study on Power Saving for MTC Devices (Release 13), 3GPP TR 43.869 V2.0.0 (Aug. 2015). (34 pages).

3GPP, 3rd Generation Partnership Project; Technical Specification Group Core Network and Terminals; Mobile radio interface Layer 3 specification; Core network protocols; Stage 3 (Release 12), 3GPP TS 24.008 V12.2.0 (Aug. 2015). (682 pages).

3GPP, 3rd Generation Partnership Project; Technical Specification Group Core Network and Terminals; Mobile Station—Serving GPRS Support Node (MS-SGSN); Logical Link Control (LLC) layer specification (Release 11), 3GPP TS 44.064 V11.0.0 (Jun. 2012). (64 pages).

3GPP, 3rd Generation Partnership Project; Technical Specification Group Services and System Aspects; Study on security aspects of Machine-Type Communications ()MTC) and other mobile data applications communications enhancements (Release 12), 3GPP TR 33.868 V12.1.0 (Jun. 2014). (116 pages).

Ericsson, Draft contribution on "Integrity protection in LLC layer and GMM layer", 3GPP TSG SA WG3 (Security) EASE TR 33.860, S3b0003; ETSI e-meeting; Oct. 8, 2015). (4 pages).

Russian Office Action with English Translation, issued in corresponding Russian Application No. 2018119077/08, dated Mar. 28, 2019, 8 pages.

Russian Search Report with English Translation, issued in corresponding Russian Application No. 2018119077/08, dated Mar. 21, 2019, 5 pages.

* cited by examiner

WIRELESS COMMUNICATIONS

CROSS REFERENCE TO RELATED APPLICATION(S)

This application is a 35 U.S.C. § 371 National Stage of International Patent Application No. PCT/EP2016/076408, filed Nov. 2, 2016, designating the United States and claiming priority to U.S. provisional application No. 62/249,538, filed on Nov. 2, 2015. The above identified applications are incorporated by reference.

TECHNICAL FIELD

This invention relates to a method of operation of a terminal device and one or more network nodes in a cellular communications network.

BACKGROUND

The Cellular Internet of Things (CIoT) is a new radio technology that is able to provide extended coverage for harsh environments, for example, basements, and is designed to serve massive number of UEs (over 50,000 per base station) using a very limited bandwidth (e.g. 160 bps).

The current assumption in 3GPP standardization is that the security mechanism for CIoT over GSM EDGE Radio Access Network (GERAN) would be based on enhancements of General Packet Radio Service (GPRS) security as introducing integrity protection for the control plane in Gb mode between the CIoT user equipment and the Serving GPRS Support Node (SGSN).

The assumption for CIoT is that the Universal Mobile Telecommunications System (UMTS) Authentication and Key Agreement (AKA) is run at the GPRS Mobility Management and Session Management (GMM/SM) layer creating the keying material, and the integrity protection is done at the Logical Link Control (LLC) layer using the integrity key (IK') created with the key derivation function from the UMTS AKA session keys.

SUMMARY

According to the present invention there is provided a method of operation of a terminal device in a cellular communications network. The method comprises: activating integrity protection for user plane data transferred between the terminal device and a first network node of the cellular communications network.

The method may comprise, before activating integrity protection for the user plane data: sending a request message from the terminal device to a second network node, wherein the request message also indicates the ability of the terminal device to use integrity protection for user plane data. In that case, the request message may also specify at least one algorithm that the terminal device is capable of using for integrity protection of user plane data.

The message may be a GMM Attach Request message, a EMM Attach Request message, a GMM Routing Area Update Request message, or a EMM Tracking Area Update Request message.

The request message may further indicate whether or not the terminal device wishes to use integrity protection for user plane data.

The method may comprise activating integrity protection for the user plane data in response to receiving a return message from the second network node, the return message specifying that integrity protection is to be used for the user plane data.

The method may comprise activating integrity protection for the user plane data in the LLC layer, in response to an activation message from the GMM layer.

The method may comprise activating integrity protection for the user plane data in the PDCP layer, in response to an activation message from the RRC layer.

The method may comprise activating integrity protection for the user plane data in the RLC or MAC layer, in response to an activation message from the GMM layer.

Where the method comprises activating integrity protection for the user plane data in the LLC layer, in response to an activation message from the GMM layer, the activation message from the GMM layer to the LLC layer may specify an integrity key and an integrity algorithm to be used.

Where the method comprises activating integrity protection for the user plane data in the PDCP layer, in response to an activation message from the RRC layer, the activation message from the RRC layer to the PDCP layer may specify an integrity key and an integrity algorithm to be used.

Where the method comprises activating integrity protection for the user plane data in the RLC or MAC layer, in response to an activation message from the GMM layer, the activation message from the GMM layer to the RLC or MAC layer may specify an integrity key and an integrity algorithm to be used.

The method may then comprise deriving said integrity key by running UMTS AKA on the USIM.

The integrity algorithm to be used may be specified in a message received from the second network node.

The first and second network nodes may be combined in an SGSN, or in an eNB, or in a Node-B or RNC, or the first network node may be a UPPE and the second network node an ASME.

The entity taking the role of UPPE may be a 3G Node-B, or a 3G RNC.

The method may comprise using null encryption for the user plane data.

According to the present invention there is provided a method of operation of a network node in a cellular communications network. The method comprises: activating integrity protection for user plane data transferred between the network node and a terminal device of the cellular communications network.

The method may comprise, before activating integrity protection for the user plane data: receiving a request message from the terminal device, wherein the request message also indicates the ability of the terminal device to use integrity protection for user plane data. In that case, the request message may also specify at least one algorithm that the terminal device is capable of using for integrity protection of user plane data.

The message may be a GMM Attach Request message, a EMM Attach Request message, a GMM Routing Area Update Request message, or a EMM Tracking Area Update Request message.

The request message may further indicate whether or not the terminal device wishes to use integrity protection for user plane data.

The method may comprise activating integrity protection for the user plane data after sending a return message to the terminal device, the return message specifying that integrity protection is to be used for the user plane data. The return message to the terminal device may specify an integrity key and an integrity algorithm to be used.

The method may comprise activating integrity protection for the user plane data in the LLC layer, in response to an activation message from the GMM layer.

The method may comprise activating integrity protection for the user plane data in the PDCP layer, in response to an activation message from the RRC layer.

The method may comprise activating integrity protection for the user plane data in the RLC or MAC layer, in response to an activation message from the GMM layer.

Where the method comprises activating integrity protection for the user plane data in the LLC layer, in response to an activation message from the GMM layer, the activation message from the GMM layer to the LLC layer may specify an integrity key and an integrity algorithm to be used.

Where the method comprises activating integrity protection for the user plane data in the PDCP layer, in response to an activation message from the RRC layer, the activation message from the RRC layer to the PDCP layer may specify an integrity key and an integrity algorithm to be used.

Where the method comprises activating integrity protection for the user plane data in the RLC or MAC layer, in response to an activation message from the GMM layer, the activation message from the GMM layer to the RLC or MAC layer may specify an integrity key and an integrity algorithm to be used.

The integrity key and integrity algorithm specified in the activation message may be the same as the integrity key and integrity algorithm specified in the return message.

The method may comprise deriving said integrity key before specifying it in the return message or the activation message.

The method may comprise determining the integrity algorithm to be used based on a message received from the terminal device specifying at least one algorithm that the terminal device is capable of using for integrity protection of user plane data.

The method may comprise activating integrity protection for user plane data transferred between the network node and a terminal device of the cellular communications network in response to receiving a message from a further network node indicating the wish of the further network node to use integrity protection for said user plane data. The further network node may be a HSS, or a SCEF.

The network node may be a SGSN, an eNB, Node-B or an RNC.

The method may comprise using null encryption for the user plane data.

According to the present invention there is provided a method of operation of a first network node in a cellular communications network. The method comprises: activating integrity protection for user plane data transferred between the first network node and a terminal device of the cellular communications network.

The method may comprise activating integrity protection for the user plane data in response to receiving a message from a second network node, said message specifying that integrity protection is to be used for the user plane data.

The message from the second network node may specify an integrity key to be used for said integrity protection, and/or an integrity algorithm to be used for said integrity protection.

The method may further comprise, before activating said integrity protection, negotiating with the terminal device an integrity algorithm to be used for said integrity protection.

The method may comprise activating integrity protection for the user plane data in the LLC layer.

The first network node may be a UPPE, or a 3G Node-B, or a 3G RNC, or a GGSN, or a P-GW, or an eNB, or a S-GW.

The second network node may be an ASME.

The method may comprise using null encryption for the user plane data.

According to the present invention there is provided a method of operation of a second network node in a cellular communications network. The method comprises: activating integrity protection for user plane data transferred between a first network node and a terminal device of the cellular communications network.

The method may comprise, before activating integrity protection for the user plane data: receiving a request message from the terminal device, wherein the request message also indicates the ability of the terminal device to use integrity protection for user plane data.

The request message may also specify at least one algorithm that the terminal device is capable of using for integrity protection of user plane data.

The message may be a GMM Attach Request message, or a GMM Routing Area Update Request message.

The request message may further indicate whether or not the terminal device wishes to use integrity protection for user plane data.

The method may comprise activating integrity protection for the user plane data after sending a return message to the terminal device, the return message specifying that integrity protection is to be used for the user plane data. The return message to the terminal device may then specify an integrity key to be used, and/or an integrity algorithm to be used.

The method may comprise activating integrity protection for the user plane data by sending a message to the first network node. The message to the first network node may specify an integrity key to be used, and/or may specify an integrity algorithm to be used.

The method may comprise deriving said integrity key before specifying it in the return message or said message to the first network node.

The method may comprise determining the integrity algorithm to be used based on a message received from the terminal device specifying at least one algorithm that the terminal device is capable of using for integrity protection of user plane data.

The method may further comprise activating integrity protection for user plane data transferred between the network node and a terminal device of the cellular communications network in response to receiving a message from a further network node indicating the wish of the further network node to use integrity protection for said user plane data. The further network node may be a HSS, or a SCEF.

The second network node may be an ASME.

The first network node may be a UPPE, or a 3G Node-B, or a 3G RNC, or a GGSN, or a P-GW, or an eNB, or a S-GW.

According to other aspects of the present invention, there are provided terminal devices and network nodes configured to operate in accordance with these aspects.

According to other aspects of the present invention, there are provided computer programs and computer program products containing instructions for causing devices to operate in accordance with these aspects.

Thus, a UE, such as a Cellular IoT UE, and a network node such as a SGSN are able to use LLC layer integrity protection for both control plane and user plane data. Use of integrity protection for user data can be negotiated. The network node may wish to use user data integrity protection if null-encryption is used. It can also be used e.g. if the CIoT UE has limited security capabilities, or if the HN wishes so.

DETAILED DESCRIPTION

Figure 1:
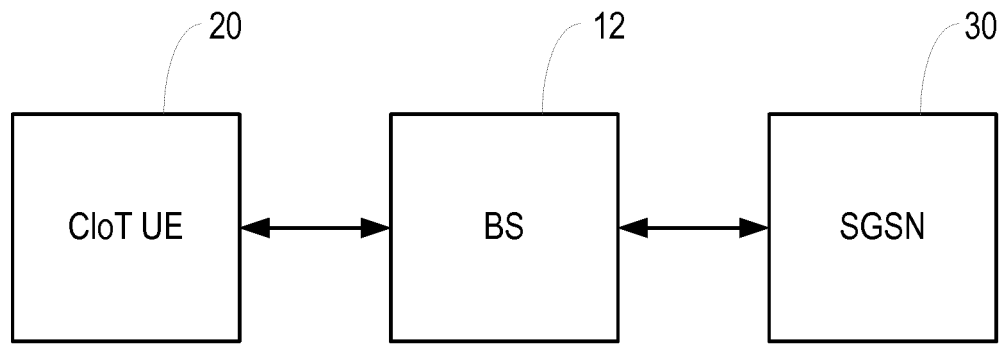
FIG. 1 illustrates a part of a cellular communications network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, etc.

A cell is associated with a base station, where a base station comprises in a general sense any network node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

FIG. 1 illustrates a part of a network 10. The network 10 comprises a basestation 12 connected to a Cellular Internet of Things (CIoT) terminal device (UE) 20 and a Serving GPRS Support Node (SGSN) 30. Of course, a network will typically include many basestations, and a very large number of terminal devices, but the present FIG. 1 is sufficient for an understanding of the present invention. The terminal device may be a user equipment device or may be a device that connects automatically to the network as required, and may be fixed or portable.

Figure 2:
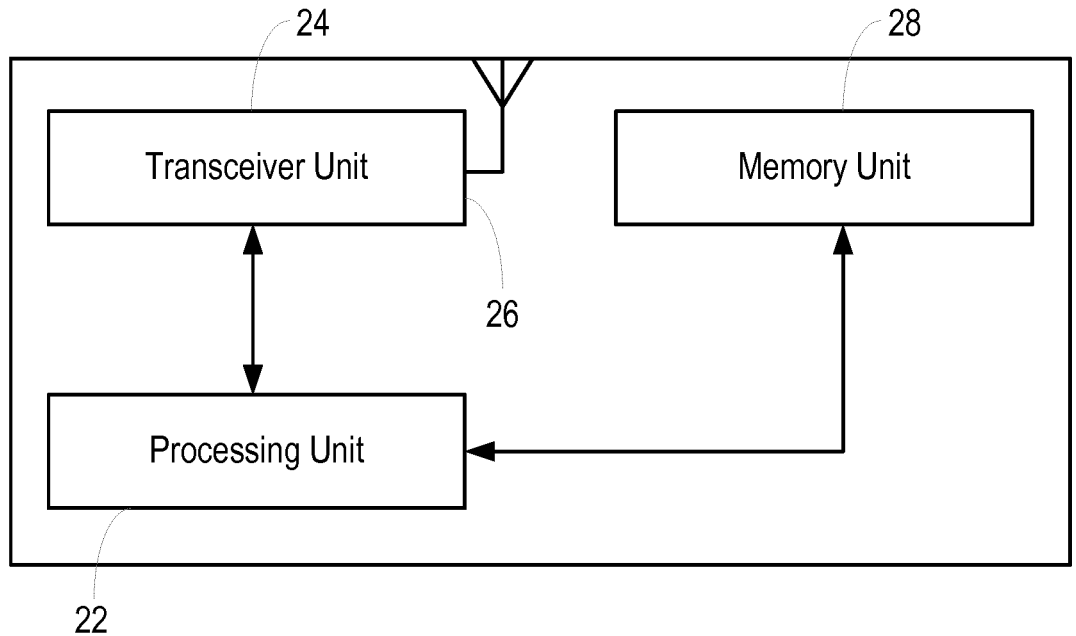
FIG. 2 illustrates a terminal device in the network of FIG. 1.

FIG. 2 shows a terminal device (UE) 20 that can be adapted or configured to operate according to one or more of the non-limiting example embodiments described. The UE 20 comprises a processor or processing unit 22 that controls the operation of the UE 20. The processing unit 22 is connected to a transceiver unit 24 (which comprises a receiver and a transmitter) with associated antenna(s) 26 which are used to transmit signals to and receive signals from a base station 12 in the network 10. The UE 20 also comprises a memory or memory unit 28 that is connected to the processing unit 22 and that contains instructions or computer code executable by the processing unit 22 and other information or data required for the operation of the UE 20. Specifically, the memory or memory unit 28 may contain instructions executable by said processing unit 22, whereby said terminal device is operative to activate integrity protection of user plane data transferred between the terminal device and a first network node of the cellular communications network.

Embodiments are described below, in which the terminal device is a Cellular Internet of Things UE. The same methods can be used by other UEs than Cellular IoT UEs.

Figure 3:
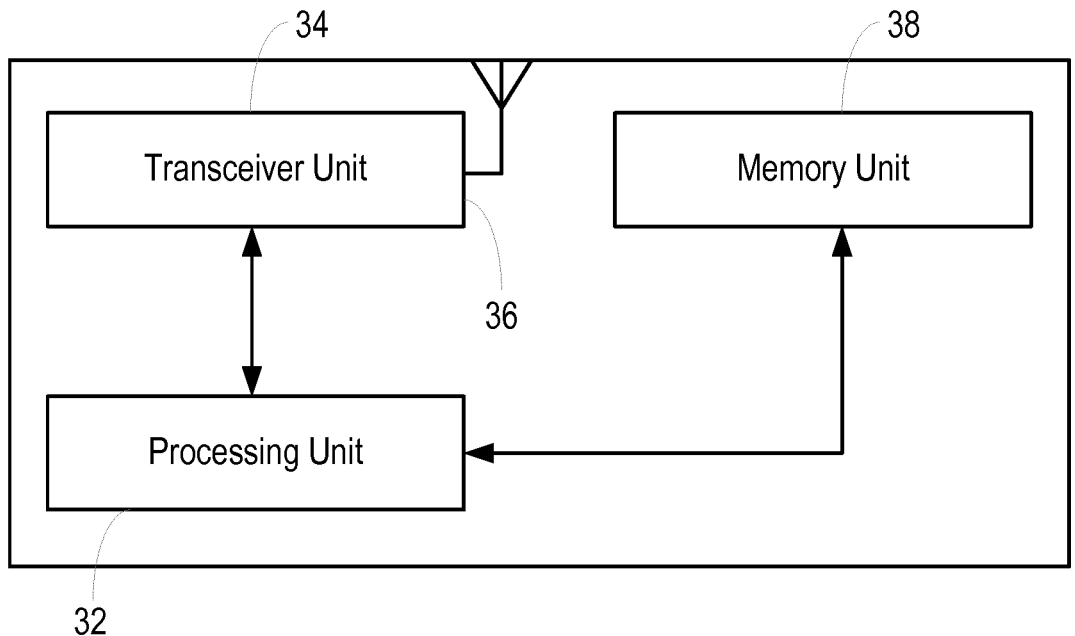
FIG. 3 illustrates a network node in the network of FIG. 1.

FIG. 3 shows a network node (which in this illustrated embodiment is a Serving GPRS Support Node (SGSN)) 30 that can be adapted or configured to operate according to one or more of the non-limiting example embodiments described. The SGSN 30 comprises a processor or processing unit 32 that controls the operation of the SGSN 30. The processing unit 32 is connected to a transceiver unit 34 (which comprises a receiver and a transmitter) with associated antenna(s) 36 which are used to transmit signals to and receive signals from terminal device(s) 20, via basestations 12 in the network 10. The SGSN 30 also comprises a memory or memory unit 38 that is connected to the processing unit 32 and that contains instructions or computer code executable by the processing unit 32 and other information or data required for the operation of the SGSN 30. Specifically, the memory or memory unit 38 contains instructions executable by the processing unit 32, whereby said network node is operative to activate integrity protection for user plane data transferred between the network node and a terminal device of the cellular communications network. In other embodiments, the network node having essentially the same structure as shown in FIG. 3 might take the form of an eNB, a Node-B or Radio Network Controller (RNC), or a UPPE, which may then be a 3G Node-B, a 3G RNC, a Gateway GPRS Support Node (GGSN), a PDN Gateway (P-GW), or a Serving Gateway (S-GW).

Figure 4:
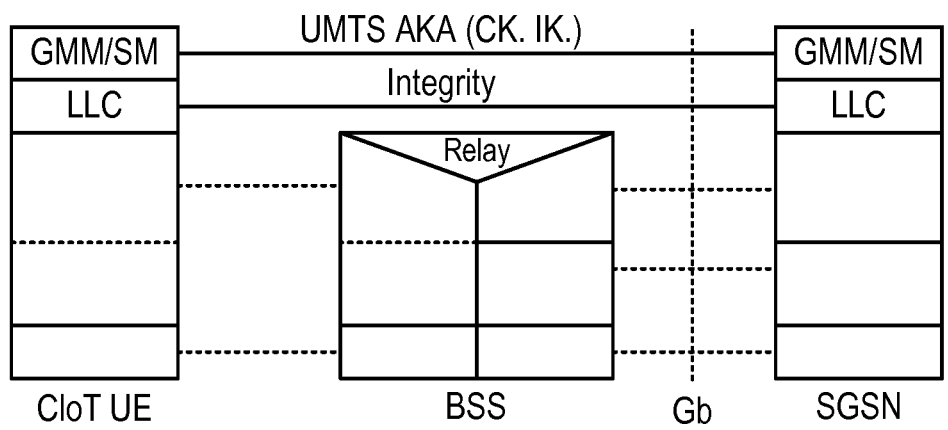
FIG. 4 illustrates protocols in use in the network of FIG. 1.

FIG. 4 illustrates a protocol layer control plane in Gb mode.

As can be seen from this figure, the Universal Mobile Telecommunications System (UMTS) Authentication and Key Agreement (AKA) is run at the GPRS Mobility Management and Session Management (GMM/SM) layer creating the keying material (CK, IK). The integrity protection is done at the Logical Link Control (LLC) layer using the integrity key (IK') created with the key derivation function from the UMTS AKA session keys.

The security feature of integrity protection was never standardized in 2G GPRS. This is a feature which could be introduced in Cellular IoT over GERAN. Integrity protection could be supported by the LLC layer in order to be able to protect layer 3 control signalling messages as GMM messages, SM messages and also SMS etc. As described herein, it could also be used to protect the user data.

Null-encryption is assumed to be needed in certain CIoT markets where encryption is not allowed. This essentially means that the user plane data would be sent unprotected. This may cause significant increase to the frequency of authentication, and in this way, it shortens the expected lifetime of battery in CIoT UE.

GERAN has been analysing the Power Saving modes for MTC Devices, for example in 3GPP TR 43.869 v13.0.0. The study focuses on specifying the Power Saving in the way that the energy consumption can be minimized, and consequently ten years of better lifetime for the CIoT UE can be guaranteed. The study assumes a limited use case, i.e. stationary CIoT UEs that are using the extended coverage offered by eGPRS but that are limited in reachability and battery capacity. There are two modes of operation, the Network triggered traffic mode, and the Mobile autonomous reporting mode. Note, however, that these may not be the only traffic modes that are relevant for EASE study. There may also be highly mobile CIoT UEs that have no battery limitations, that benefit from extended coverage and that require unlimited reachability.

In network triggered traffic mode, the CIoT UE is sending a report to the network entity, typically only when triggered by the network to do so. This requires that the CIoT UE must be reachable as a result of network paging. There are two different phases in implementing the reachability. The first one is immediately after every report sending period when it can be guaranteed that that the CIoT UE is reachable long enough to receive triggers from the network. The second one is for making sure that the CIoT UE is reachable later within the sleeping mode, and wakes up periodically to see if there are new incoming paging messages. The longer the device can remain in the power saving state, the larger the power saving.

Figure 5:
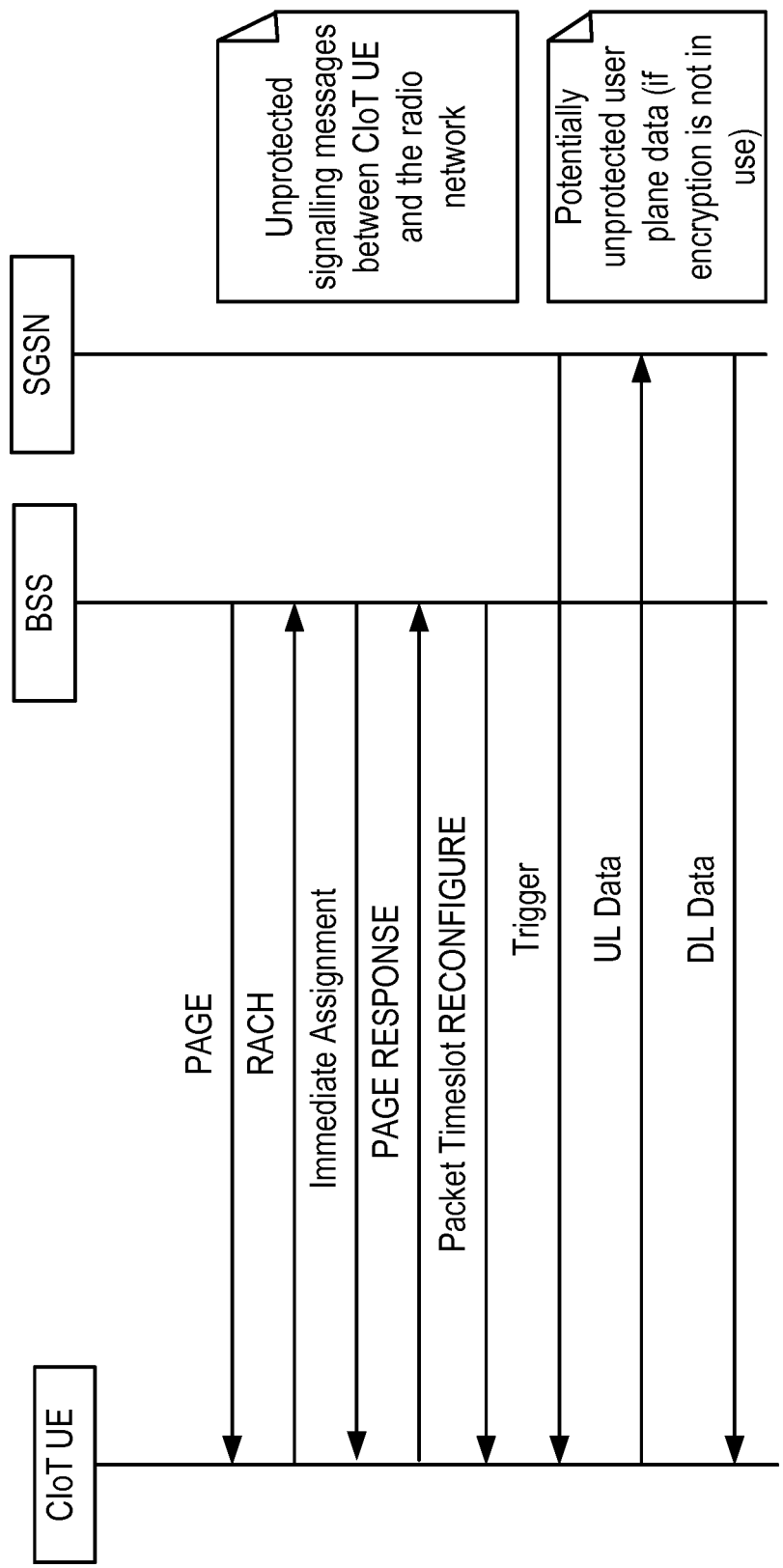
FIG. 5 is a signalling diagram.

FIG. 5 illustrates the network triggered traffic mode. The figure assumes that the triggering packets are user plane data; however, they could also be part of control plane. It can be seen from the figure that the CIoT UE and BSS exchange some unprotected signalling messages before the CIoT UE starts sending user plane data. According to all current solution proposals in 3GPP TR 33.860 v0.3.0, the user plane data can also be sent unprotected if encryption is not used.

In mobile autonomous reporting mode, the CIoT UE is sending data autonomously, e.g. in a periodic manner. The network may adjust the exact time for reporting in order to balance the network traffic load at specific times. Reachability may still be possible via paging or immediately after the reporting events but it is also possible that the reachability is not needed or used. In the most optimized case, there are no periodical RAUs if the RAU Timer value is configured to be just bigger than the periodic UE wake-up/reporting time.

Figure 6:
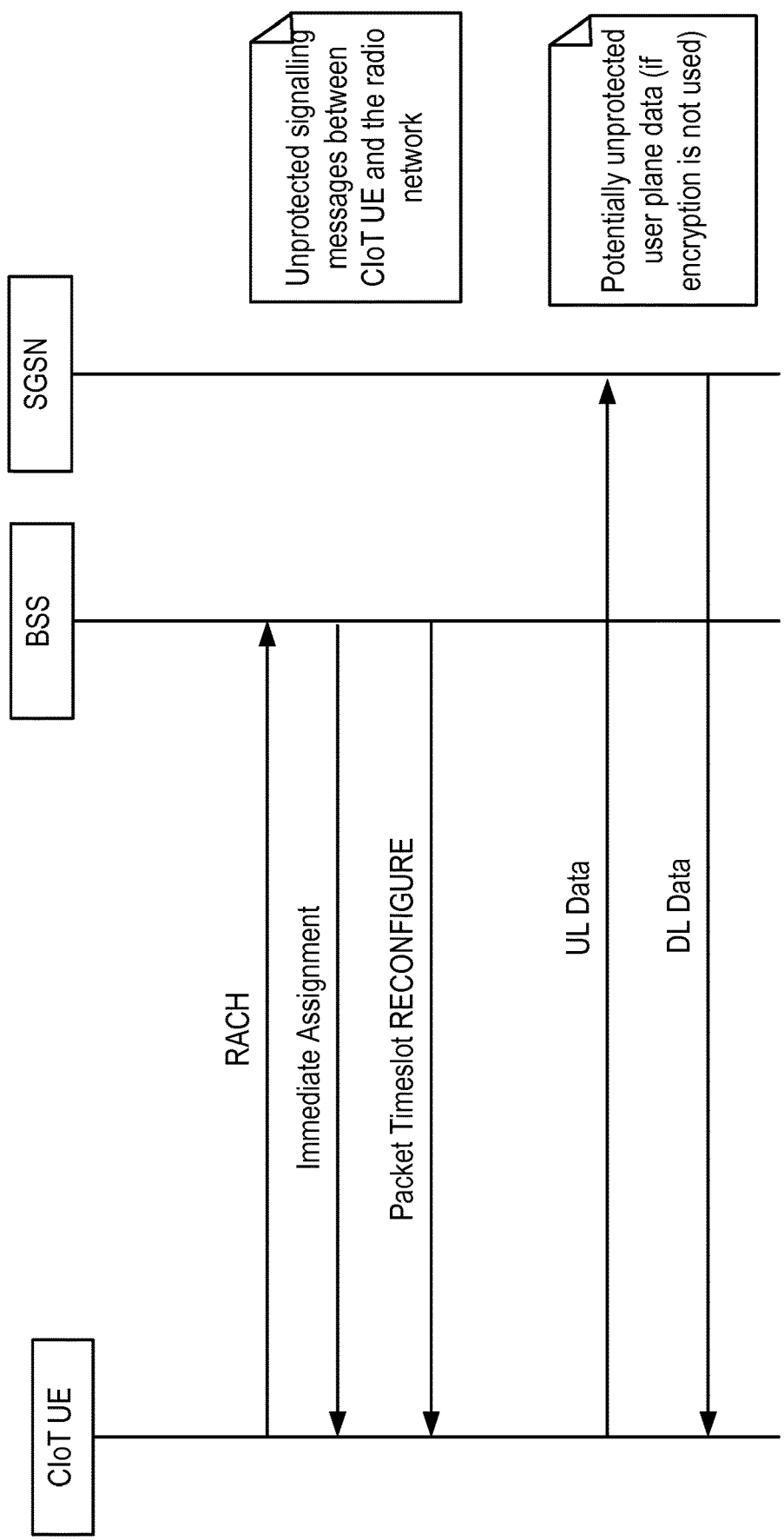
FIG. 6 is a signalling diagram.

FIG. 6 illustrates the mobile autonomous reporting. It can be seen from the figure that the CIoT UE and BSS exchange some unprotected signalling messages before the CIoT UE starts sending user plane data. Again, according to all current solution proposals in TR 33.860 v0.3.0, the user plane data can also be sent unprotected if encryption is not used.

As described in more detail below, the integrity protection mechanism that is currently being specified at LLC layer to protect the control plane is re-used to protect the user plane. This solution describes how the integrity protection of user data is negotiated between CIoT UE and SGSN.

In brief summary, in some embodiments, the CIoT UE may indicate the ability of using integrity protection for user plane protection to the network (e.g. SGSN) in e.g. the GMM Attach Request or GMM Routing Area Update Request, together with other CIoT UE security capabilities. The CIoT UE may also indicate the wish of using or not using integrity protection of user data.

The SGSN may echo back the CIoT UE's security capabilities received in GMM Attach Request message or GMM Routing Area Update Request message back to the CIoT UE in an integrity protected GMM message, so that the CIoT UE is able to check if the received CIoT UE's security capabilities matches with the CIoT UE's security capability it sent in GMM Attach Request message or GMM Routing Area Update Request message to the SGSN. In the existing solutions, CIoT UE's security capabilities includes the supported integrity protect algorithms and the supported encryption algorithms in the CIoT UE. This invention would add the support of specified integrity protection algorithms for user plane protection too. If the UE's wish for using the integrity protection of user data was also added to the original GMM Attach Request or GMM Routing Area Update Request from the CIoT UE to SGSN, this wish would also need to be echoed back from SGSN to CIoT UE, and integrity protected.

The solution includes some variants for also Home Subscriber Server (HSS) or Service Capability Exposure Function (SCEF) to indicate the wish of using integrity protection of user data to SGSN. The integrity protection could be tied to the use of null-encryption, in which case the use of user plane integrity protection would be an integral part of the use of null-encryption algorithm GEA0.

Figure 7:
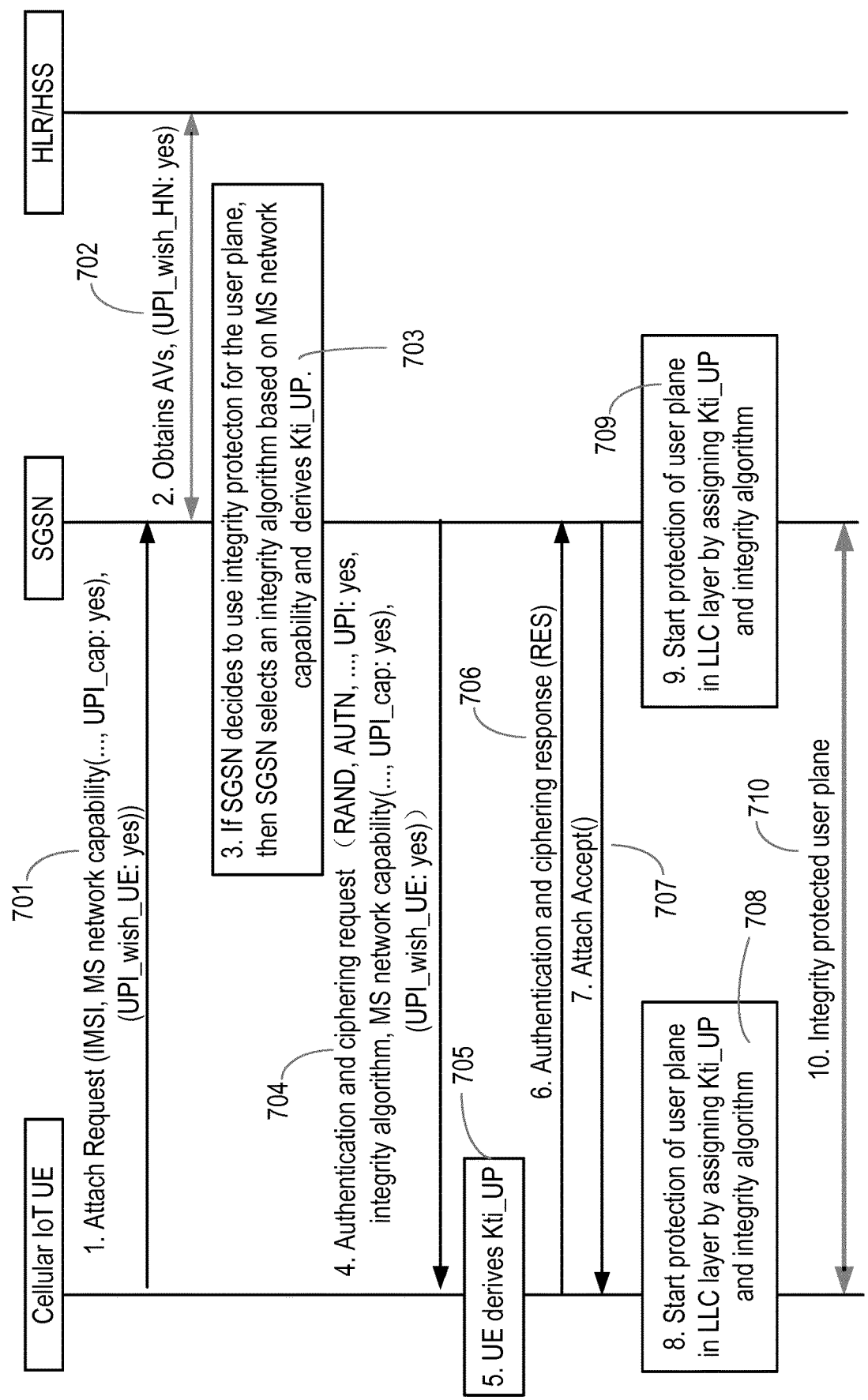
FIG. 7 is a signalling diagram.

FIG. 7 illustrates a method in which integrity protection for user plane data is established, in the case of a 3G network.

As discussed in more detail below, it is the responsibility of the GMM layer to start or activate integrity protection of user plane in the LLC layer. This applies to both CIoT UE and SGSN. The GMM layer in the CIoT UE should start or activate integrity protection of user plane in the LLC layer when a successful run of UMTS AKA on the USIM has taken place.

The GMM layer sends an indication to the LLC layer to handle this. This indication is internal to the CIoT UE and SGSN. This applies to both CIoT UE and SGSN. The indication from the GMM layer to the LLC layer may include the integrity key Kti_UP and the selected integrity algorithm. The integrity key for user plane Kti_UP may be different from the integrity key for the control plane Kti_CP. The algorithm may be the same as for the integrity protection of control plane, and could be indicated using a single parameter. This applies to both CIoT UE and SGSN.

The integrity algorithm negotiation procedure is described below, similar to cipher algorithm negotiation.

In this illustrated embodiment, integrity protection of user plane is activated in LLC layer after CIoT UE has received the Attach Accept message or Routing Area Update Accept from SGSN.

The illustrated embodiment includes four new parameters:

UPI_cap (user plane integrity protection capability): this is a parameter in MS network capabilities indicating that the CIoT UE is capable of integrity protecting the user plane.

UPI_wish_UE (wish of using user plane integrity protection from UE side): this is an optional parameter that the UE may add to the Attach Request indicating that UE wish to use the integrity protection of user plane UPI_wish_HN (wish of using user plane integrity protection from the Home Network side): this is an optional parameter that the Home Network (e.g. HSS) may add to the AVs indicating that integrity protection of user plane should be used. (Note that in another variant, this is not a wish but a mandatory command for turning the integrity protection on.)

UPI (user plane integrity protection used): this is a parameter in Authentication and Ciphering Request indicating to the UE that user plane shall be integrity protected; this parameter is added by SGSN.

Note that the mechanism described for integrity capability negotiation and integrity protection in FIG. 7 applies to other mobility management procedures as well as Routing Area Update procedure.

In step 701, the Cellular IoT UE sends attach request to SGSN. The cipher algorithms and integrity algorithms supported by the Cellular IoT UE are included in the MS network capability parameters (not shown in the Figure). The cellular IoT UE includes its IMSI, and the following new parameters: "UPI_cap: yes" indicating that the CIoT UE is capable of protecting the integrity of user plane, and, optionally, "UPI_wish_UE: yes" indicating that the CIoT UE is wishing to integrity protect the user plane. "UPI_cap" is also optional if all UEs support this feature.

If the solution is integrated to 3GPP Service Capability Exposure Function (SCEF) capabilities, the owner of the CIoT UE could configure the use of integrity protection for the user data on/off using a Web interface.

In step 702, the SGSN obtains AVs (quintets) from HLR/HSS based on IMSI. It may include a new optional parameter "UPI_wish_HN: yes" indicating that the Home Network wishes that the integrity of the user plane was protected between UE and SGSN.

The SGSN determines that the requesting UE is a cellular IoT UE based on the MS network capability parameters. In step 703, the SGSN selects the control plane protection mode: a cipher algorithm and an integrity algorithm from the MS network capability and then derives cipher key (Ktc) and integrity key (Kti_CP) (not shown in FIG. 7). The SGSN also decides if the user plane shall be protected. This is a local decision, and can be based on several factors. For example, if SGSN does not support other encryption algorithms than null-encryption, it may want to protect the integrity of user plane. Also, it may take the wishes from the UE or the HN indicated in "UPI_wish_UE" and "UPI_wish_HN" into account, and decide to integrity protect the user plane. If SGSN decides to integrity protect the user plane, it chooses the integrity algorithm (assumed to be the same as for the control plane integrity protection), and derives the integrity key (Kti_UP). It indicates the use of integrity protection for user plane by adding the "UPI: yes" parameter. Kti_UP is in minimum 128 bits long.

In step 704, the SGSN sends the Authentication and Ciphering Request to the CIoT UE including 1) the chosen cipher algorithm and integrity algorithm, 2) the indication of using integrity protection also for user plane (UPI: yes), 3) an echo of the MS network capabilities (including the new UPI_cap parameter) indicated to it by the UE, and 4), if present, an echo of the optional parameter UPI_wish_UE. The Authentication and Ciphering Request message may be integrity protected.

In step 705, the Cellular IoT UE runs UMTS AKA with the USIM and derives Ktc, Kti_CP and Kti_UP from CK and IK. The Cellular IoT UE verifies the integrity of the message, then the Cellular IoT UE checks the echoed MS network capability and the optional UPI_wish_UE parameter. The CIoT UE verifies that there has been no attack on MS network capability or UPI_wish_UE originally sent by the Cellular IoT UE in the GMM Attach Request. If the echoed parameters do not match those sent by the CIoT UE, then the CIoT UE can conclude that a Man-in-the-middle attack has taken place on the air-interface and drops the connection with the network.

In step 706, the Cellular IoT UE sends an Authentication and Ciphering Response message including the RES to the SGSN.

The control plane between Cellular IoT UE and SGSN can now be confidentiality protected and integrity protected by using Ktc and Kti_CP. In step 707, the SGSN sends Attach Accept message to the CIoT UE.

In step 708, the GMM layer in the CIoT UE activates integrity protection for the user plane in the LLC layer by assigning the integrity key Kti_UP. The selected algorithm is the same as for the integrity protection of control plane.

In step 709, the GMM layer in the SGSN activates integrity protection for the user plane in the LLC layer by assigning the integrity key Kti_UP. The selected algorithm is the same as for the integrity protection of control plane.

As shown at 710, the CIoT UE and SGSN can now send integrity protected user plane.

As described above, the method can be used with 3GPP access network technologies such as 2G GPRS. However, a similar method could also be used in other 3GPP access network technologies as UTRAN and LTE. It could potentially be used also for end-to-middle security where the security endpoint for the user plane security would be an entity in the Home Network.

Figure 8:
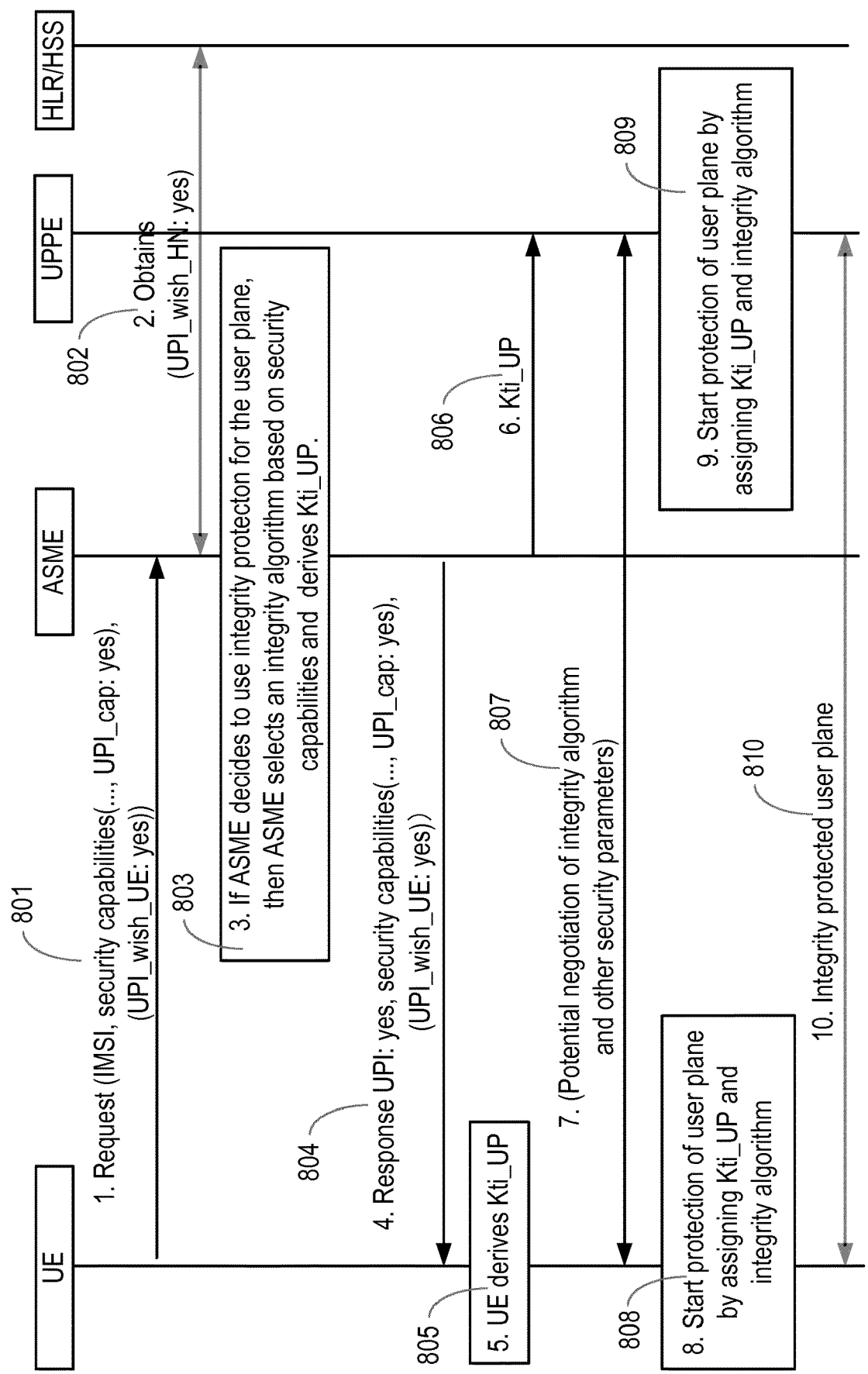
FIG. 8 is a signalling diagram.

FIG. 8 illustrates another embodiment, in which the negotiation of the user plane integrity protection is done between the UE and an Access Security Management Entity (ASME), and the user plane between the UE and a User Plane Protection Entity (UPPE) is integrity protected. This embodiment applies if the invention is used in 3G or LTE security where the role of UPPE is taken by the Node-B, RNC, or GGSN (in the case of 3G) or by the P-GW, eNodeB or Serving Gateway (S-GW) (in the case of LTE). UPPE may also be an entity in the Home Network, e.g. the HPLMN Security Endpoint (HSE) discussed in 3GPP TR 33.863,14.0.0. The HSE may be collocated with the GGSN/P-GW. This embodiment does not take a stand on how the UE and UPPE agree on which integrity protection algorithm to use. It could be part of the security capability negotiation between UE and ASME (steps 801 and 804 in FIG. 8), or part of the data exchange between the UE and UPPE (step 807 in FIG. 8).

In step 801, the UE sends a request to ASME. The cipher algorithms and integrity algorithms supported by the UE are included in the security capabilities parameter (not shown in FIG. 8). The UE includes its IMSI, and the following new parameters: "UPI_cap: yes" indicating that the UE is capable of protecting the integrity of user plane, and an optional parameter "UPI_wish_UE: yes" indicating that the UE is wishing to integrity protect the user plane. "UPI_cap" is also optional if all UEs support this feature.

If the solution is integrated to 3GPP Service Exposure Function (SCEF) capabilities, the owner of the CIoT UE could configure the use of integrity protection for the user data on/off using a Web interface.

In step 802, the ASME may obtain AVs (quintets) from HLR/HSS based on IMSI (or it may have done this phase already earlier in the process). The response from HLR/HSS may include (or may have included) a new optional parameter "UPI_wish_HN: yes" indicating that the Home Network wishes that the integrity of the user plane was protected between UE and UPPE.

In step 803, the ASME decides if the user plane shall be protected. This may be a local decision, and can be based on several factors. For example, if ASME does not support other encryption algorithms than null-encryption, it may want to protect the integrity of user plane. Also, it may take the wishes from the UE or the HN indicated in "UPI_wish_UE" and "UPI_wish_HN" into account, and decide to integrity protect the user plane. If ASME decides to integrity protect the user plane, it derives the integrity key (Kti_UP). It indicates the use of integrity protection for user plane by adding the "UPI: yes" parameter.

In step 804, the ASME sends the Response to the UE including 1) the indication of using integrity protection also for user plane (UPI: yes), 2) the security capabilities (including the new UPI_cap parameter) and 3) the optional parameter UPI_wish_UE. The Response message is integrity protected by means outside the scope of this invention.

In step 805, the UE verifies the integrity of the message, then the UE checks the echoed security capabilities and the optional UPI_wish_UE parameter. The UE verifies that there has been no attack on security capabilities or the UPI_wish_UE originally sent by the UE in the Request. The UE derives Kti_UP from CK and IK. If the echoed parameters do not match those sent by the CIoT UE, then the CIoT UE can conclude that a Man-in-the-middle attack has taken place on the air-interface and drops the connection with the network.

In step 806, the ASME forwards the integrity algorithm and the Kti_UP to UPPE.

As shown at step 807, the UE and UPPE may negotiate security parameters including which integrity algorithm to use. The integrity algorithm to be used may also come from ASME but is not specified in this embodiment.

In step 808, the UE activates integrity protection for the user plane by assigning the integrity key Kti_UP and the integrity protection algorithm.

In step 809, the UPPE activates integrity protection for the user plane by assigning the integrity key Kti_UP and the integrity protection algorithm.

As shown at 810, the UE and UPPE can now send integrity protected user plane.

In another variant, it is not optional for the SGSN/ASME to follow the wish of the HLR/HSS. If the HLR/HSS indicates that user plane shall be protected (UPI_wish_HN: yes), the SGSN/ASME is mandated to enable integrity protection of user plane. There could be some additional conditions that would need to be met, e.g. if no encryption was used between the UE and the SGSN/ASME, fulfilling the HLR/HSS wish would be mandatory.

In another variant, none of the new UPI parameters are needed. The integrity protection of user data is tied directly to the null-encryption algorithm GEA0. Whenever GEA0 is used, the integrity protection of user data is always turned on.

Figure 9:
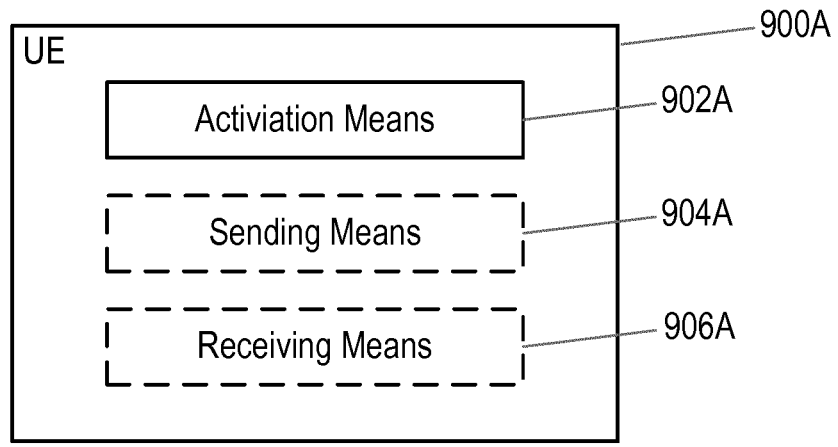
FIG. 9 illustrates a terminal device in the network of FIG. 1.

FIG. 9 illustrates functional units in a terminal device which may execute any of the methods described above, for example according to computer readable instructions received from a computer program. It will be understood that the units illustrated in FIG. 9 are software implemented functional units, and may be realised in any appropriate combination of software modules.

Specifically, the terminal device 900A comprises an activation means 902A for activating integrity protection for user plane data transferred between the terminal device and a network node of the cellular communications network. The terminal device 900A may also comprise a sending means 904A for sending messages to the network node as described above. The terminal device 900A may also comprise a receiving means 906A for receiving messages from the network node as described above.

Figure 10:
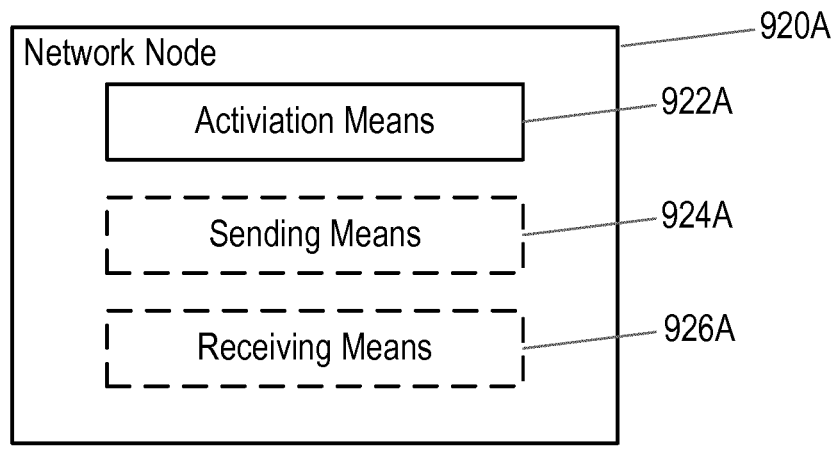
FIG. 10 illustrates a network node in the network of FIG. 1.

FIG. 10 illustrates functional units in a network node for a cellular communications network which may execute any of the methods described above, for example according to computer readable instructions received from a computer program. It will be understood that the units illustrated in FIG. 10 are software implemented functional units, and may be realised in any appropriate combination of software modules.

Specifically, the network node 920A comprises an activation means 922A for activating integrity protection for user plane data transferred between a terminal device and the network node. The network node 920A may also comprise a sending means 924A for sending messages to the network node as described above. The terminal device 920A may also comprise a receiving means 926A for receiving messages from the network node as described above.

Figure 11:
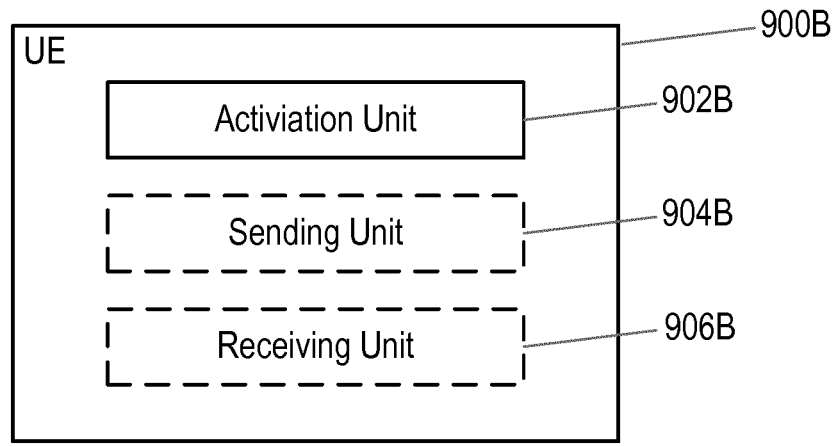
FIG. 11 illustrates a first network node in a cellular communications network.

FIG. 11 illustrates functional units in another embodiment of terminal device which may execute any of the methods described herein, for example according to computer readable instructions received from a computer program. It will be understood that the units illustrated in FIG. 11 are hardware implemented functional units, and may be realised in any appropriate combination of hardware elements.

Specifically, the terminal device 900B comprises an activation unit 902B for activating integrity protection for user plane data transferred between the terminal device and a network node of the cellular communications network. The terminal device 900B may also comprise a sending unit 904B for sending messages to the network node as described above. The terminal device 900B may also comprise a receiving unit 906B for receiving messages from the network node as described above.

Figure 12:
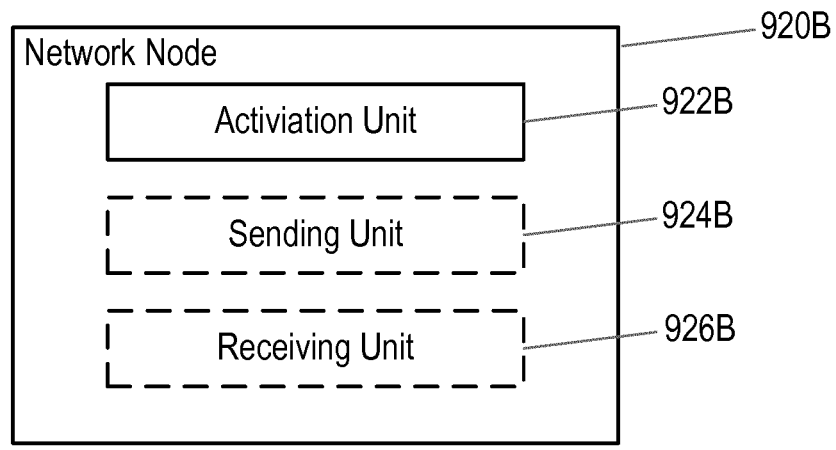
FIG. 12 illustrates a second network node in the network of FIG. 1.

FIG. 12 illustrates functional units in another embodiment of network node for a cellular communications network which may execute any of the methods described herein, for example according to computer readable instructions received from a computer program. It will be understood that the units illustrated in FIG. 12 are hardware implemented functional units, and may be realised in any appropriate combination of hardware elements according to embodiments.

Specifically, the network node 920B comprises an activation unit 922B for activating integrity protection for user plane data transferred between a terminal device and the network node. The network node 920B may also comprise a sending unit 924B for sending messages to the network node as described above. The terminal device 920B may also comprise a receiving unit 926B for receiving messages from the network node as described above.

Figure 13:
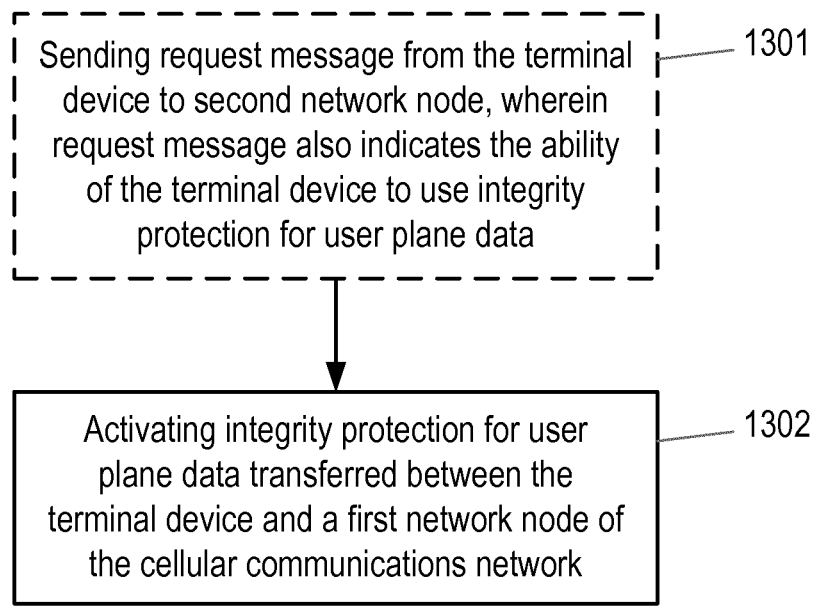
FIG. 13 is a flow chart, illustrating a method of operation of a terminal device in a cellular communications network.

FIG. 13 is a flow chart, illustrating a method of operation of a terminal device in a cellular communications network. The method comprises, as an optional first step 1301, sending a request message from the terminal device to a second network node, wherein the request message also indicates the ability of the terminal device to use integrity protection for user plane data. The method then comprises, as step 1302, activating integrity protection for user plane data transferred between the terminal device and a first network node of the cellular communications network.

The terminal device may comprise an activation module, for activating integrity protection for user plane data transferred between the terminal device and a first network node of the cellular communications network.

Figure 14:
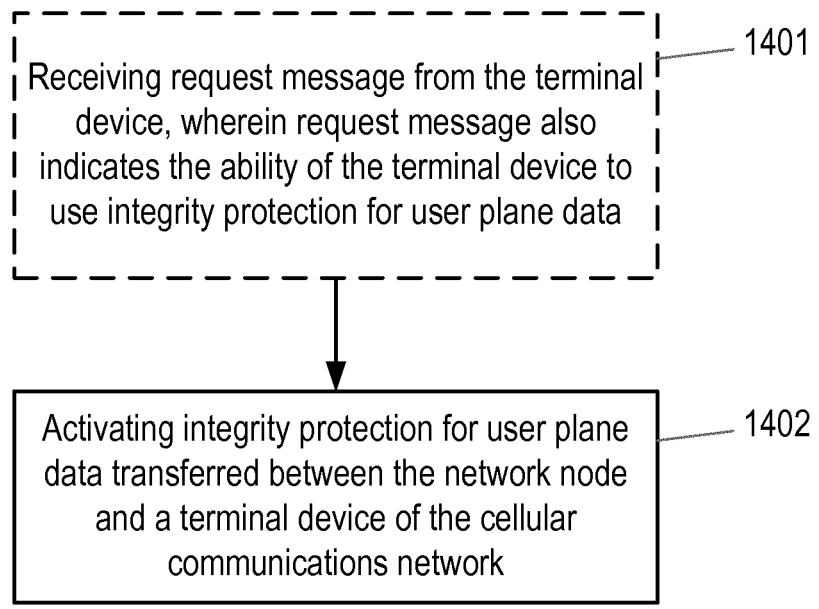
FIG. 14 is a flow chart, illustrating a method of operation of a network node in a cellular communications network.

FIG. 14 is a flow chart, illustrating a method of operation of a network node in a cellular communications network. The method comprises, as an optional first step 1401, receiving a request message from a terminal device of the cellular communications network, wherein the request message also indicates the ability of the terminal device to use integrity protection for user plane data. The method then comprises, as step 1402, activating integrity protection for user plane data transferred between the network node and the terminal device.

The network node may comprise an activation module, for activating integrity protection for user plane data transferred between the network node and a terminal device.

Figure 15:
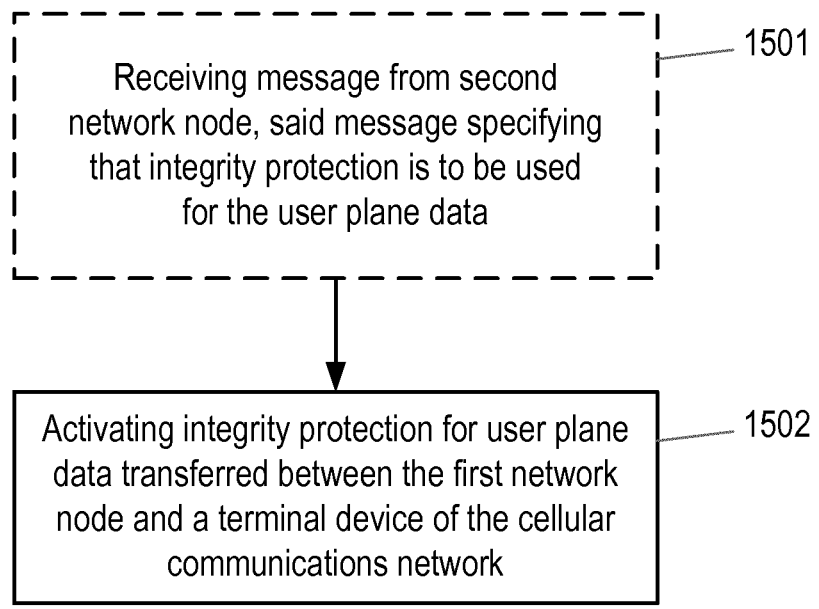
FIG. 15 is a flow chart, illustrating a method of operation of a first network node in a cellular communications network.

FIG. 15 is a flow chart, illustrating a method of operation of a first network node in a cellular communications network. The method comprises, as an optional first step 1501, receiving a message from a second network node, said message specifying that integrity protection is to be used for user plane data. The method then comprises, as step 1502, activating integrity protection for the user plane data transferred between the first network node and a terminal device of the cellular communications network.

The first network node may comprise an activation module, for activating integrity protection for user plane data transferred between the first network node and a terminal device of the cellular communications network.

Figure 16:
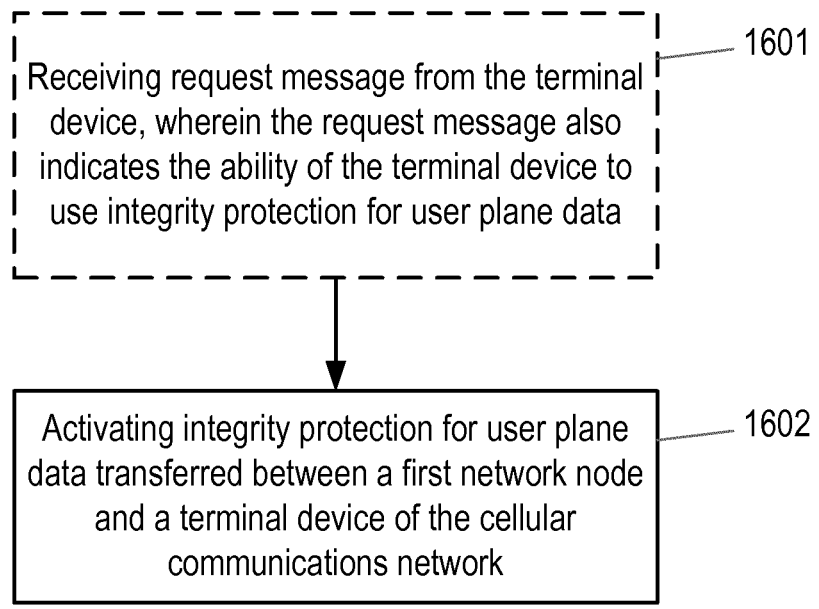
FIG. 16 is a flow chart, illustrating a method of operation of a second network node in a cellular communications network.

FIG. 16 is a flow chart, illustrating a method of operation of a second network node in a cellular communications network. The method comprises, as an optional first step 1601, receiving a request message from a terminal device of the cellular communications network, wherein the request message also indicates the ability of the terminal device to use integrity protection for user plane data. The method then comprises activating integrity protection for user plane data transferred between a first network node and the terminal device.

The second network node may comprise an activation module for activating integrity protection for user plane data transferred between a first network node and a terminal device.

There are thus described methods of operation of a terminal device and a network node that allow for integrity protection, as well as a terminal device itself and a network node itself.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation of a terminal device in a cellular communications network, the method comprising:
   the terminal device transmitting, via a base station of an access network to a core network support node in a core network, an Attach Request that includes network capability parameters, the network capability parameters including: i) cipher algorithm parameters specifying a set of cipher algorithms supported by the terminal device and ii) integrity algorithm parameters specifying a set of integrity algorithms supported by the terminal device;
   after transmitting the Attach Request to the core network support node, the terminal device receiving an Authentication and Ciphering request transmitted by the core network support node to the terminal device via the access network, wherein the Authentication and Ciphering request transmitted by the core network support node to the terminal device via the access network comprises: i) cipher algorithm information specifying a cipher algorithm chosen by the core network support node, ii) integrity algorithm information specifying an integrity algorithm chosen by the core network support node, iii) said cipher algorithm parameters included in the Attach request, and iv) said integrity algorithm parameters included in the Attach request;

after receiving the Authentication and Ciphering request, the terminal device activating integrity protection for user plane data transferred between the terminal device and the core network support node.

2. The method of claim 1, further comprising:

before activating integrity protection for the user plane data, sending a request message from the terminal device to a second network node, wherein the request message also indicates the ability of the terminal device to use integrity protection for user plane data.

3. The method of claim 2, wherein the request message also specifies at least one algorithm that the terminal device is capable of using for integrity protection of user plane data.

4. The method of claim 2, wherein the request message is a General Packet Radio Service Mobility Management (GMM) Attach Request message or an Evolved Packet System Mobility Management (EMM) Attach Request message or a General Packet Radio Service Mobility Management (GMM) Routing Area Update Request message or an Evolved Packet System Mobility Management (EMM) Tracking Area Update Request message.

5. The method of claim 2, wherein the request message further indicates whether or not the terminal device wishes to use integrity protection for user plane data.

6. The method of claim 2, further comprising activating integrity protection for the user plane data in response to receiving a return message from the second network node, the return message specifying that integrity protection is to be used for the user plane data.

7. The method of claim 2, wherein the core network support node and the second network node are combined in a Serving General Packet Radio Service Support Node (SGSN).

8. The method of claim 7, further comprising deriving an integrity key by running Universal Mobile Telecommunications Service Authentication and Key Agreement (UMTS AKA) on the Universal Subscriber Identity Module (USIM).

9. The method of claim 7, wherein the integrity algorithm to be used is specified in a message received from the second network node.

10. The method of claim 1, further comprising, after receiving the Authentication and Ciphering request, the terminal device running Universal Mobile Telecommunications System (UMTS) Authentication and Key Agreement (AKA) with a Universal Subscriber Identity Module (USIM) to derive a cipher key (Kc) and an integrity key (Ki).

11. The method of claim 1, further comprising, after receiving the Authentication and Ciphering request, the terminal device checking that network capability parameters included in the Authentication and Ciphering request are the same as the network capability parameters included in the Attach Request.

12. The method of claim 1, further comprising activating integrity protection for the user plane data in the Packet Data Convergence Protocol (PDCP) layer, in response to an activation message from a Radio Resource Control (RRC) layer, and the activation message from the RRC layer to the PDCP layer specifies an integrity key and an integrity algorithm to be used.

13. The method of claim 1, further comprising activating integrity protection for the user plane data in the Radio Link Control (RLC) or Medium Access Control (MAC) layer, in response to an activation message from a General Packet Radio Service Mobility Management (GMM) layer, and the activation message from the GMM layer to the RLC or MAC layer specifies an integrity key and an integrity algorithm to be used.

14. The method of claim 1, further comprising activating integrity protection for the user plane data in the Logical Link Control (LLC) layer, in response to an activation message from the General Packet Radio Service Mobility Management (GMM) layer, and the activation message from the GMM layer to the LLC layer specifies an integrity key and an integrity algorithm to be used.

15. The method of claim 1, further comprising using null encryption for the user plane data.

16. The method of claim 1, the method further comprising:

after receiving the Authentication and Ciphering request, the terminal device transmitting toward the core network support node an Authentication and Ciphering response; and after transmitting the Authentication and Ciphering response, the terminal device receiving an Attach Accept message transmitted from the core network support node.

17. The method of claim 1, wherein the core network support node is a Serving General Packet Radio Service Support Node (SGSN).

18. A method of operation of a core network support node in a cellular communications core network, the core network support node being in communication with a terminal device via a base station of radio access network, the method comprising:

the core network support node receiving an Attach Request message transmitted by the terminal device, wherein the Attach Request includes network capability parameters, the network capability parameters including: i) cipher algorithm parameters specifying a set of cipher algorithms supported by the terminal device and ii) integrity algorithms specifying a set of integrity algorithms supported by the terminal device;

the core network support node, after receiving the Attach Request, transmitting to the terminal device via the base station an Authentication and Ciphering request, wherein the Authentication and Ciphering request comprises: i) cipher algorithm information specifying a cipher algorithm chosen by the core network support node and ii) integrity algorithm information specifying an integrity algorithm chosen by the core network support node, wherein the Authentication and Ciphering request further comprises said cipher algorithm parameters included in the Attach request and said integrity algorithm parameters included in the Attach request; and the core network support node activating integrity protection for at least one of i) user plane data transmitted by the terminal device or ii) user plane data transmitted to the terminal device.

19. The method of claim 18, further comprising activating integrity protection for user plane data in a Logical Link Control (LLC) layer, in response to an activation message from a General Packet Radio Service Mobility Management (GMM) layer, and the activation message from the GMM layer to the LLC layer specifies an integrity key and an integrity algorithm to be used.

20. The method of claim 18, further comprising activating integrity protection for the user plane data in the Packet Data Convergence Protocol (PDCP) layer, in response to an activation message from the Radio Resource Control (RRC) layer, the activation message from the RRC layer to the PDCP layer specifies an integrity key and an integrity algorithm to be used.

21. The method of claim 18, further comprising activating integrity protection for the user plane data in the Radio Link Control (RLC) or Medium Access Control (MAC) layer, in response to an activation message from the General Packet Radio Service Mobility Management (GMM) layer, the activation message from the GMM layer to the RLC or MAC layer specifies an integrity key and an integrity algorithm to be used.

22. The method of claim 18, further comprising, before activating integrity protection for the user plane data, receiving a request message from the terminal device, wherein the request message also indicates the ability of the terminal device to use integrity protection for user plane data.

23. The method of claim 22, wherein the request message also specifies at least one algorithm that the terminal device is capable of using for integrity protection of user plane data.

24. The method of claim 22, wherein the request message is a General Packet Radio Service Mobility Management (GMM) Attach Request message, an Evolved Packet System Mobility Management (EMM) Attach Request message, a General Packet Radio Service Mobility Management (GMM) Routing Area Update Request message, or an Evolved Packet System Mobility Management (EMM) Tracking Area Update Request message.

25. The method of claim 22, further comprising activating integrity protection for the user plane data after sending a return message to the terminal device, the return message specifying that integrity protection is to be used for the user plane data.

26. The method of claim 25, wherein the return message to the terminal device specifies an integrity key and an integrity algorithm to be used.

27. The method of claim 26, further comprising deriving said integrity key before specifying it in the return message or the activation message.

28. The method of claim 26, further comprising determining the integrity algorithm to be used based on a message received from the terminal device specifying at least one algorithm that the terminal device is capable of using for integrity protection of user plane data.

29. The method of claim 18, further comprising:
the core network support node obtaining an authentication vector (AV) from a network entity.

30. The method of claim 18, the method further comprising:
after receiving the Attach Request message, the network node deriving a cipher key and/or an integrity key for data protection, wherein
the network node activates the integrity protection using the derived cipher key and/or the derived integrity key.

31. A method of operation of a terminal device in a cellular communications network, the method comprising:
the terminal device transmitting, via a base station to a support node in a core network, an Attach Request that includes network capability parameters, the network capability parameters including: i) cipher algorithm parameters specifying a set of cipher algorithms supported by the terminal device and ii) integrity algorithm parameters specifying a set of integrity algorithms supported by the terminal device; and
after transmitting the Attach Request, the terminal device receiving an Authentication and Ciphering request transmitted by the core network support node to the terminal device, wherein the Authentication and Ciphering request transmitted by the core network support node to the terminal device comprises: i) cipher algorithm information specifying a cipher algorithm chosen by the core network support node, ii) integrity algorithm information specifying an integrity algorithm chosen by the core network support node, iii) said cipher algorithm parameters included in the Attach request, and iv) said integrity algorithm parameters included in the Attach request;
after receiving the Authentication and Ciphering request, the terminal device transmitting toward the core network support node an Authentication and Ciphering response.

* * * * *

UNITED STATES PATENT AND TRADEMARK OFFICE
CERTIFICATE OF CORRECTION

PATENT NO. : 11,374,941 B2  
APPLICATION NO. : 15/772760  
DATED : June 28, 2022  
INVENTOR(S) : Torvinen et al.

Page 1 of 2

It is certified that error appears in the above-identified patent and that said Letters Patent is hereby corrected as shown below:

On the Title Page

Page 2, item [56], in Column 2, Lines 2-3, delete "3P-140615—3rd" and insert -- GP-140615—3rd --, therefor.

Page 2, item [56], in Column 2, Line 4, delete "Centre ;" and insert -- Centre; --, therefor.

Page 2, item [56], in Column 2, Line 34, delete "()MTC)" and insert -- (MTC) --, therefor.

In the Drawings

In Fig. 1, Sheet 1 of 10, insert Main Designator -- 10 --.

In Fig. 2, Sheet 1 of 10, insert Main Designator -- 20 --.

In Fig. 3, Sheet 2 of 10, insert Main Designator -- 30 --.

In Fig. 7, Sheet 5 of 10, and on the title page, the illustrative figure, for Step "703", in Line 1, delete "protecton" and insert -- protection --, therefor.

In Fig. 8, Sheet 6 of 10, for Step "803", in Line 1, delete "protecton" and insert -- protection --, therefor.

In the Specification

In Column 1, Line 22, delete "(CloT)" and insert -- (CIoT) --, therefor.

In Column 1, Line 34, delete "CloT" and insert -- CIoT --, therefor at each occurrence throughout the patent and drawings.

Signed and Sealed this  
Eleventh Day of October, 2022

Katherine Kelly Vidal  
*Director of the United States Patent and Trademark Office*

CERTIFICATE OF CORRECTION (continued)
U.S. Pat. No. 11,374,941 B2

In Column 6, Line 14, delete "by the skilled" and insert -- by those skilled --, therefor.

In Column 6, Line 51, delete "(CloT)" and insert -- (CIoT) --, therefor.

In Column 8, Line 17, delete "that that the" and insert -- that the --, therefor.

In Column 9, Line 56, delete "plane" and insert -- plane. --, therefor.

In Column 10, Line 29, delete "cipher key (Ktc)" and insert -- cipher key (Kc) --, therefor.

In Column 11, Line 13, delete "at 710," and insert -- in step 710, --, therefor.

In Column 11, Lines 49-50, delete "Service Exposure Function (SCEF)" and insert -- Service Capability Exposure Function (SCEF) --, therefor.

In Column 12, Line 7, delete "parameter) and" and insert -- parameter), and --, therefor.

In Column 12, Line 22, delete "at step" and insert -- in step --, therefor.

In Column 12, Line 32, delete "at 810," and insert -- in step 810, --, therefor.

In Column 13, Line 9, delete "terminal device 920A" and insert -- network node 920A --, therefor.

In Column 13, Line 44, delete "terminal device 920B" and insert -- network node 920B --, therefor.

In Column 13, Line 54, delete "as step" and insert -- in step --, therefor.

In Column 14, Line 1, delete "as step" and insert -- in step --, therefor.

In Column 14, Line 3, delete "terminal device." and insert -- terminal device of the cellular communications network. --, therefor.

In Column 14, Line 12, delete "as step" and insert -- in step --, therefor.

In Column 14, Line 27, delete "comprises activating" and insert -- comprises, at step 1602, activating --, therefor.

In Column 14, Line 29, delete "device." and insert -- device of the cellular communications network. --, therefor.

In Column 15, Lines 43-44, in Claim 8, delete "Universal Mobile Telecommunications Service" and insert -- Universal Mobile Telecommunications System --, therefor.